Figure 1:
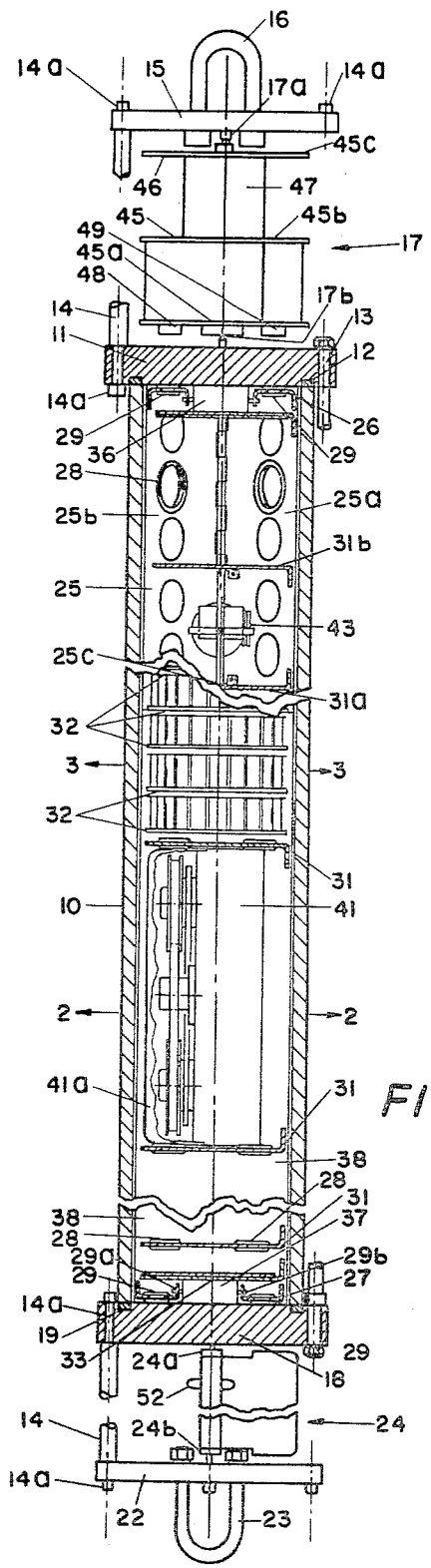

July 11, 1967 C. A. MIVILLE 3,330,155
MAGNETIC TAPE OCEANOGRAPHIC METER
Filed April 16, 1964 2 Sheets-Sheet 1

INVENTOR
Charles A. Miville
BY
ATTORNEY

United States Patent Office 3,330,155
Patented July 11, 1967

3,330,155
MAGNETIC TAPE OCEANOGRAPHIC METER
Charles A. Miville, Mont Vernon, N.H., assignor to Sanders Associates, Inc., Nashua, N.H., a corporation of Delaware
Filed Apr. 16, 1964, Ser. No. 360,259
14 Claims. (Cl. 73—189)

This invention relates to a new and improved meter for measuring ocean current and direction and other parameters.

The presently employed meters for measuring ocean currents and directions commonly employ photographic techniques and are beset by a number of problems inherent in photographic type meters. Among these may be mentioned the following:

(a) Film records from such meters require laborious, costly, and time consuming operations to prepare or convert to a form suitable for input to an electronic data processor, which compiles from them the final and most meaningful data presentation.

(b) Film recordings from the photographic meters require very careful handling and processing, with the ever present possibility of losing recorded data through damage to the film.

(c) The photographic technique, presently employed in such instruments, uses excessive space in the meter housing because of the local length requirement of the camera, and prevents the efficient use of such space, which otherwise could be used for additional batteries to extend the operating life of the equipment, or could be used to hold additional transducers for measuring other parameters.

(d) The film recording technique is not flexible and does not allow for possible future requirements of telemetry or data processing variations.

(e) Present photographic current meters have no special provisions for protection from mechanical shocks during handling, which in turn frequently necessitates overhaul and repair on shipboard before the apparatus can be used.

The electronic meter according to this invention eliminates or greatly reduces these problems. It reads current direction and velocity by the use of electronic apparatus and records the data on magnetic tape having dimensions and format for running through directly a standard electronic data processor, which in turn will supply the final data presentation in any of several desired forms. No time-consuming hand operations are required to prepare the data for entry into the computer, and no elaborate special equipment is required as in the case of photographic film records. The magnetic tape record produced by the instrument of this invention need not be handled as carefully as photographic film. It is not damaged by spray, or even when immersed in sea water for extended periods of time, and no degradation of the stored data results.

In addition, electronic data processing and magnetic tape data storage require less space in the meter housing than film storage and handling devices. This space may be utilized to hold more batteries, extending the period during which the equipment may be left on station for longer than 30 days, or the space saved can be used to house additional transducers for measuring salinity, temperature, sound velocity, or other parameters. Data from such additional sensors can be recorded on the magnetic tape along with the current direction and velocity information, and can be recorded on the tape in sequence with the velocity and direction information, and requires little or no modification of the recorder.

The magnetic tape meter according to this invention can be quite easily adapted to radio or acoustical telemetry operations if desired, and may thus send out signals which may be received and processed at a distance. In addition, it is easily protected from shock in handling and shipment, may be easily checked for operational readiness, is more flexible, rugged and useful than photographic type meters, and yet can be produced in quantities at a price competitive with such meters.

From the foregoing it will be understood that among the objects of this invention are:

To provide an oceanographic meter capable of measuring and/or recording and/or transmitting signals simultaneously with the measurement of the desired parameters;

To provide such an instrument which records on magnetic tape the parameters measured;

To provide such an instrument which produces a record, on magnetic tape, of the parameters measured, in such form as to be supplied to an electronic data processor without requiring the laborious, costly, and time consuming operations heretofore necessary with instruments of the photographic type;

To provide such an instrument which produces a record which does not require careful handling and processing, and which is not liable to damage by exposure to salt water and spray;

To provide such an instrument of the same size as photographic type instruments, but in which considerably more space is available, resulting from elimination of the space-consuming photographic equipment;

To provide such an instrument of the same size as the photographic type, but in which considerably more space is available to permit the inclusion of additional batteries, providing longer operating life on station, and/or permitting the inclusion of equipment for measuring additional parameters;

To provide such an instrument embodying protection from mechanical shock during shipment and handling, thereby reducing necessary overhaul and "trouble shooting" on shipboard before use;

To provide such an instrument which is considerably more flexible than the present type photographic equipment, and which lends itself better to present and future requirements of telemetry and electronic data processing.

Still other objects and advantages of this invention will be apparent from the specification.

Figure 2:
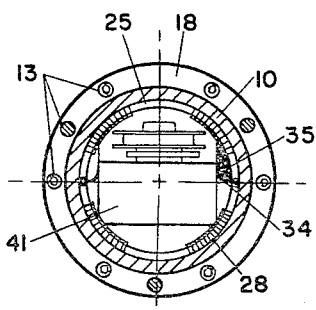
Figure 3:
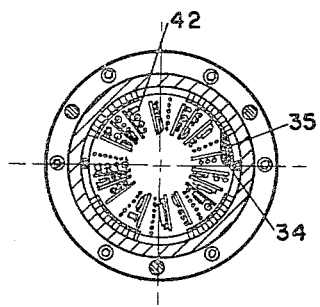
Figure 4:
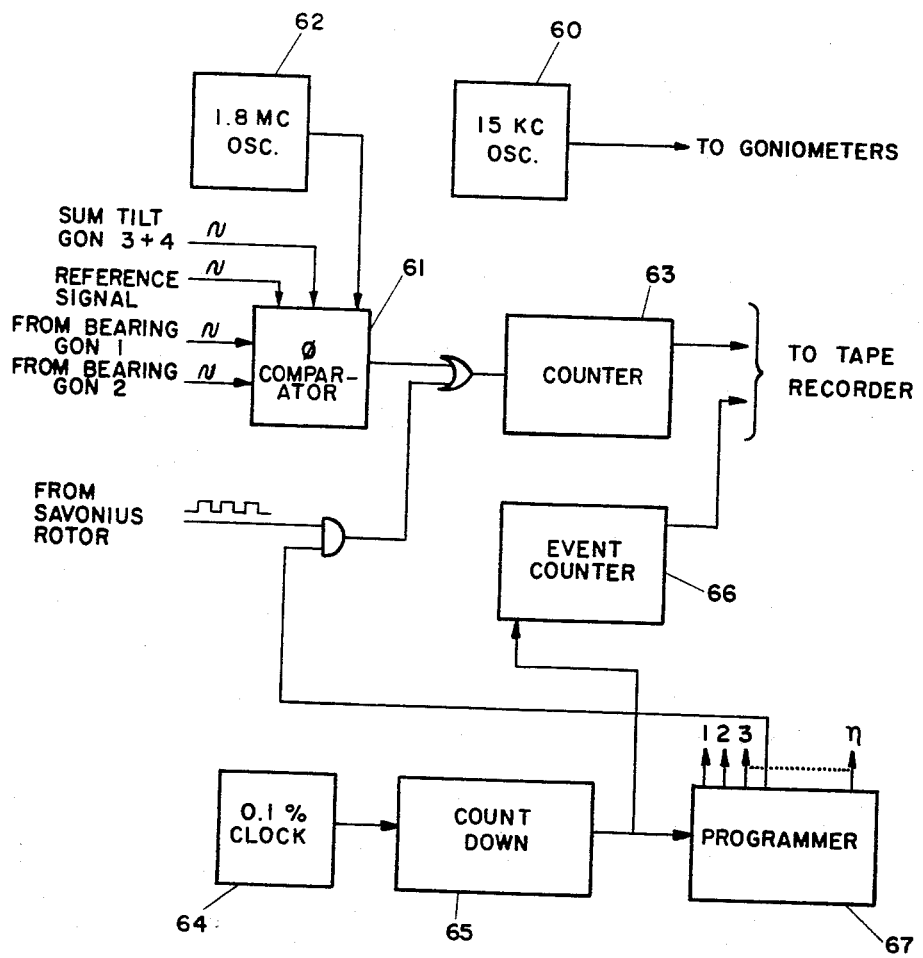

The features of novelty which are believed to be characteristic of this invention are set forth with particularity in the appended claims. The invention itself, however, both as to its fundamental principles and as to its particular embodiments, will best be understood by reference to the specification and accompanying drawing, in which FIG. 1 is a longitudinal elevation, partly broken away and partly in section, of an electronic oceanographic meter according to this invention, FIG. 1A is a sketch illustrating the relationship of a compass goniometer and two tilt goniometers employed in the oceanographic meter of FIG. 1, FIG. 2 is a sectional elevation on lines 2—2 of FIG. 1, FIG. 3 is a sectional elevation on lines 3—3 of FIG. 1, and FIG. 4 is a circuit block diagram of the electronic circuit employed in our instrument.

Figure 1A:
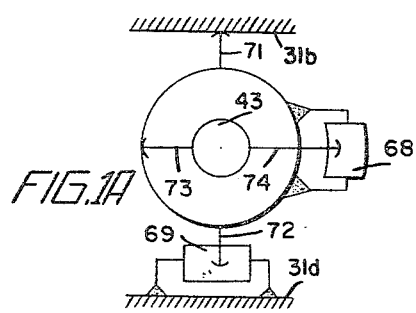

Referring now more particularly to FIG. 1, 10 designates the longitudinal hollow pressure housing of the instrument, which in this embodiment may be an extruded 7075 T6 aluminum tube of 6 inches inside diameter and 7 inches outside diameter, and approximately 42 inches long. Neither the material nor size of the housing are critical; other materials may be used if desired, and the dimensions may be varied. The material and dimensions are merely the preferred example of what may be used.

The lower end of tube 10 is closed by end cap 11, which may be aluminum, seated on gasket 12 and carrying support rods 14, which may be aluminum, securing lower cage end plate 15, also preferably aluminum, in position, and fastened by stainless steel cap screws. For clarity, part of the support rods 14 are shown broken away, but it will be understood that they are disposed around end cap 11. The end plate 15 carries U-bolt 16, to which a hook and cable may be secured for handling.

Lower end cap 11, spaced end plate 15, and support rods 14 form an open cage, in which is mounted a well-known Savonius rotor of usual form, rotated by the current to be measured.

The upper end of housing 10 is closed by upper end cap 18, similar to lower end cap 11, seated on gasket 19. Tie rods 13, preferably of stainless steel, are spaced around housing 10 and have their upper and lower ends secured to upper and lower end caps 18 and 11, respectively. As in the lower cage, spaced end plate 22 is carried by support rods 14 fastened by stainless steel cap screws 14a, and upper spaced end plate carries U-bolt 23, to which a hook and cable may be attached. Upper end cap 18, spaced end plate 22, and upper supports rods 14 form an open cage within which is mounted a vane 24, mounted for rotation to indicate the direction of flow of the current, the velocity of which is measured by the Savonius rotor 17.

The Savonius rotor 17 and vane 24 are provided with bearings 17a and 17b, and 24a and 24b, respectively, in the form of tungsten carbide pivots, turning in plastic sockets which contain polished tungsten carbide end stones.

The electronic and mechanical components of the instrument are preferably enclosed within a separate, lightweight perforated aluminum cylindrical housing 25 within the pressure housing. The housing 25 consists of two half cylinders or troughs 25a and 25b, hinged together by hinge 25c and provided with inwardly flanged end caps 26 and 27 telescoping into opposite ends of hinged housing 25. This housing is self-contained, and is free from permanent attachment to pressure housing end plates 11 and 18, and is readily insertable in and removable from the pressure housing 10. When removed and locked in open position, the hinged halves of internal housing 25 provide a stable base for maintenance and bench work.

The housing 25 has shock isolation pads 28 of impregnated foam mounted in the perforations, to isolate the inner housing 25 from external housing 10, and additional shock isolation pads 29 which isolate the inner housing end plates from pressure housing end plates 11 and 18.

The inner housing 25 also contains partitions 31 suitably secured within it, which separate the space within the inner housing into compartments within which the components are mounted. The partitions 31 may be movably mounted and held by friction, for example, to allow longitudinal change of position to allow easy removal or addition of units and components. These partitions may also carry shock isolation pads 28. Shock isolation disks 32 may be provided at various points in housing 25 as desired. Mumetal shields 33 may be provided at opposite ends of housing 25, carried on partitions 31. A wiring harness raceway 34 is left in the various partitions 31, to permit the wiring harness 35 to run the length of the housing.

Each inner housing end plate 26 and 27 has a central hole (in the embodiment shown) 2 inches in diameter in which are mounted encoders 36 and 37, respectively, the former encoding current velocity, and the latter current direction, and each is held against its respective end plate by pressure from a shock isolation pad 29. A battery pack 38 may be slipped into place and is held firmly in place by shock isolation pads 28 when the inner housing 25 is closed. A magnetic tape recorder assembly 41 slips in between separator plates 31 and is firmly supported by shock isolation pads when the inner housing is closed. The circuit boards 42 are preferably individually removable "postage stamp" circuits, and are supported on all sides and faces by pads of impregnated foam, and are arranged so that each circular electronic section may be swung out separately for inspection and maintenance.

A bearing goniometer and a magnetic compass 43, the compass of which is built to withstand a short period shock of 1,000 G's, is gimbal mounted within a gimbal 70 between a pair of bulkheads 31a and 31b. The x and y axes tilt readings for the entire meter are made with a pair of housing tilt goniometers 68 and 69 mounted on the ring of the gimbal system (see FIG. 1A which is a sketch, not to scale). The construction and operation of the goniometer compass is a separate invention assigned to the owner of the invention of this application and found in a patent to Paul F. Hayner et al., Patent No. 3,264,554, for "Capacitor Goniometer Compass," and for the purpose of this application any suitable goniometer compass or solid state devices for direction indicating known in the art may be utilized. The housing tilt goniometers 68 and 69 are similar to the compass goniometers with no compass being required. The relative tilts are derived from, for example, a pendulum substituted for the compass.

Gimbal 70 is mounted for rotation about two shafts 71 and 72. Shaft 71 is rotatably coupled to bulkhead 31b, and shaft 72 is rotatably coupled to the rotor of goniometer 69, the stator thereof being fixed to bulkhead 31a. Thus, any movement of the rotor of goniometer 69 will cause rotation of gimbal 70. Likewise, bearing goniometer 43 is rotatably coupled to gimbal 70 via shaft 73 and to the rotor of goniometer 68 via shaft 74, the stator of goniometer 68 being fixed to gimbal 70. Hence, any rotation of the rotor of goniometer 69 will cause bearing goniometer 43 to rotate accordingly. In this manner, the two tilt goniometers 68 and 69 cause alignment of bearing goniometer 43.

Assembly of the components into inner housing 25 is relatively simple. The only units which require specific orientation are the goniometer compass 43 and the directional vane follower which is a part of directional encoder 37. These are keyed so they may be assembled in only one way. The tape recorder 41, battery pack 38, circuit boards, and rotor encoder 36 may be set into their nondirectional shock isolation supports in any convenient orientation, taking care that interconnecting wiring is located safely in the wiring harness raceway 34. The magnetic tape reels may be removed from the tape recorder or replaced at any time the inner housing is open, simply by opening the tape recorder reel cover 41a so they are accessible. Closing the inner housing and hooking its latch pins (not shown) completes the electronic assembly. The inner housing with its contents may then be slipped into the pressure housing 10 from either end. The final stages of assembly involve fastening the direction vane and rotor cages to the pressure housing 10 and fastening tie rods 13. The unit may be turned on or put into operation by turning it to a vertical position to close the contacts of a mercury switch (not shown) which may be interposed in the common battery return or ground wire. Components are selected to minimize or eliminate corrosion and electrolysis and should be either shock or vibration resistant or mounted on shock isolation pads. Properly designed and assembled, the instrument will give long, maintenance-free life during storage, transit, and in use.

As stated, current velocity is measured by a standard Savonius rotor, the rotational speed of which has a direct linear relationship to the velocity of the current. Current velocity can also be measured through the employment of Doppler effect devices. The rotor 17 preferably consists of polystyrene discs 45a, 45b and 45c cemented to two 4-inch polystyrene half cylinders 47 rotated 90° to each other to reduce speed fluctuations. The rotor is supported at each end by bearings 17a and 17b consisting of tungsten carbide pivots molded into plastic supports, and the pivots turn in plastic bearing holes which contain highly polished tungsten carbide end stones.

The end plate of the rotor nearest the pressure housing 10 carries a pair of plastic coated magnets 48 and 49 which generate a rotating magnetic field when the rotor 17 rotates. The velocity encoder 36 inside the pressure housing 10 senses rotation of this field and closes a magnetic-reed switch twice for each rotation of the rotor. The electronic portion of the meter contains a well known counting circuit which measures current velocity by counting switch closures for a given period of time.

The directional vane 24 is mounted in the cage at the upper end of the instrument, with its rotational axis coincident with the center line of the pressure housing 10, and is statically balanced and mounted for rotation so as to aline itself with the direction of flow of water current. The angular position of the vane is determined by means of a plastic coated magnet 52 mounted in the vane's leading edge. The magnetic field, the orientation of which is determined by the angular position of the vane, is sensed by the angular position encoder 37 through end plate 18. Thus, no leads are necessary either from the Savonius rotor or the vane through the pressure housing.

As with the Savonius rotor, the vane 24 has tungsten carbide pivots, turning in plastic bushings against tungsten carbide end stones in its bearings 24a and 24b. The direction encoder 37 inside the pressure housing is held in place against the end plate 18 in a hole in internal housing 25 by shock isolation pads 29, and if desired, by set screws 29a and 29b in end plate 27.

The bearing goniometer associated with direction encoder 37 is connected to the electronic circuitry in a manner to be described; it receives a reference signal, and returns a signal displaced in phase in proportion to the angular displacement of vane 24. This signal is compared electronically with the output of the compass goniometer to give water current flow versus magnetic north.

Meter tilt angle and tilt direction, in case the instrument is not truly vertical, is necessary to correct the direction and velocity readings for housing tilt. The bearing goniometer compass 43 is gimbal mounted on two horizontal axes perpendicular to each other and weighted to remain vertical, and provides a vertical reference for tilt measurements. Housing tilt goniometers 68 and 69 (preferably but not necessarily, capacitive), similar to the one on the compass, are mounted at one end bearing on each horizontal axis. The outputs of these horizontal-axis goniometers 68 and 69 are phase shifts of a reference signal, and are directly proportional to the respective tilt angles about the two horizontal axes. Both tilt axes are limited to approximately ±140°, permitting the use of service loop wires to the goniometers without the use of slip rings. The gimbal ring carries a set of ball bearings which support the goniometer compass. The gimbal also contains pivots of its own for mounting in the bearings which support it within the inner housing 25. The gimbal also supports parts of both tilt goniometers and the signal wires for the goniometer compass.

The electronic circuits perform two distinct functions. They (1) Convert to digital form, and write on magnetic tape, the outputs from the direction, velocity, and tilt sensors.

(2) Recycle the instrument for reading and recording every five minutes (a different time cycle may be employed if desired).

Referring now to FIG. 4, 60 indicates a 15 kc. sine wave source, the output of which is fed to goniometers 1 and 2. One goniometer, for example, goniometer 1, is attached to a compass; the other follows direction vane 24 as already described. The phase angle of the 15 kc. signal returned from goniometer 1 indicates the direction of the compass with respect to the pressure housing 10. The phase angle of the 15 kc. signal returned from goniometer 2 indicates the direction of vane 24 with respect to the pressure housing. By measuring the phase difference between the two signals, the angle between the compass (magnetic north) and the vane is determined, thus giving the direction of the vane based on magnetic north. As the variation of the compass is known for most locations, this direction may be easily corrected to geographic north.

The phase angle may be measured by an electronic phase comparator 61, well known in the art, and not necessary to be described in detail. The phase comparator 61 gates on pulses at the zero crossing of one goniometer output and gates off the pulses at the zero crossing of the second goniometer output. The pulses to be gated on and off are generated by a 1.8 mc. oscillator 62 having a frequency 120 times that of the 15 kc. goniometer output signal. Thus, each successive 1.8 mc. pulse represents 3° phase shift.

By counting in a binary counter 63 the pulses which occur between zero crossings of the two goniometer outputs, a binary code representing phase shift (vane direction from north) is generated. This binary code information is then written (recorded) on magnetic tape by tape recorder 41. Pressure housing tilt is determined and recorded in substantially the same way.

Current velocity is obtained from the output of the Savonius rotor, which generates a rotating magnetic field as it turns. This field is sensed and converted into pulses by encoder 36. By counting the pulses for a known period in binary counter 63, the speed of the rotor is determined, and the binary coded output from counter 63 is then recorded by the magnetic tape recorder.

Measurements are taken during data cycles, which, in the embodiment of the invention herein shown and described, occur at five-minute intervals, although, of course, a different time cycle may be employed. To determine the data cycle, a low frequency oscillator 64 and count-down circuit 65 are used, both well known in the art. This circuitry has an accuracy of 0.1%, resulting in an error of approximately 45 minutes over a 30-day period. By recording the time when the current meter was started and stopped, the data processing computer can interpolate the data and determine more precise time values. The low frequency oscillator and count-down circuits operate continuously, once the instrument is turned on, as above explained, and are, therefore, designed for very low power consumption.

When the data cycle is initiated, two things happen. First, the event counter 66 is advanced one unit. Second, a programmer 67 (well known in the art) is directed, by means of a command signal, to begin the sequence of events which make up a data cycle. Such a program might be, for example:

(1) Advance event counter 66 one unit.
(2) Write contents of event counter on magnetic tape.
(3) Step (advance) tape recorder.
(4) Turn on phase counter and read direction goniometers.
(5) Write direction on tape.
(6) Step tape recorder.
(7) Read tilt goniometers.
(8) Write tilt data on tape.
(9) Step tape recorder.
(10) Count pulses from Savonius rotor.
(11) Write count on tape.
(12) Step tape recorder.
(13) Turn off power (except to clock 64 and count down circuits 65).

The data are recorded by the incremental magnetic tape transport in digital form, using a straight binary code. From this, it should be understood that the tape recorder does not run continuously as in sound recordings, but is simply stepped to a fresh area just before any new data are to be recorded, thus economizing space on the tape and reducing power drain which would otherwise occur. Each measurement of the individual parameters is represented by one computer "word," written as a parallel presentation of seven "bits" through the recording head to tape media. Seven "bits" in straight binary form allow an accuracy of one part in 128 ($2^7$). Periodically the tape transport automatically provides an interblock gap between recorded data, to provide compatibility with the data storage capability of the processing computer when the recorded tape is played into the computer for analysis and readout. This may be the form of 150 blank steps provided after every 512 operating cycles, to present an inter-block gap in the interest of compatibility with the computer readout. This will draw only negligible power because of the low current and low duty cycle involved.

The selected tape format is compatible with a slightly modified IBM 1401 magnetic tape data processing system, which may be used to put the data into a different format acceptable to other equipment such as a "Fortran" program, or off-line, tape input curve plotters at minimum cost. The data storage tape from the instrument of this invention differs from the standard IBM binary tape in only two respects. First, the parity channel contains a data bit instead of a check bit. Second, no horizontal check character is written at the end of inter-record gaps. A relatively inexpensive modification of the IBM 1401 computer allows such a tape to be read into the 1401 core storage. This modification reads the "parity" bit and the data bits into the corresponding core bits and creates a word mark bit in core to assure correct core parity. The horizontal check character is not required. A simple program can examine the data in core and write the correct decimal number on a BCD tape for further processing.

While in the foregoing we have described our invention and the best mode presently known to us for practicing the same, it should be understood that modifications and changes may be made, as will be clear to those skilled in the art, without departing from the spirit and scope of our invention.

What is claimed is:

1. An oceanographic meter for measuring the direction and velocity of ocean currents, comprising, in combination, a hollow watertight pressure housing, a water current-actuated rotor and a water current-driven direction vane mounted externally of said housing, means driven by said rotor and said vane for producing magnetic fields within said housing, and electronic means within said housing for translating said magnetic fields into signals indicating water current velocity and direction, said meter characterized by the absence of mechanical or electrical connections between said rotor and said vane, said rotor and the interior of said housing, and said vane and the interior of said housing.

2. An oceanographic meter for measuring the direction and velocity of ocean currents, comprising, in combination, a hollow elongated watertight pressure housing having no openings therein, a water current-actuated rotor and a current-driven direction vane mounted on the exterior of said housing, magnets mounted on said rotor and said vane for producing magnetic fields within said housing, and means within said housing for translating said magnetic fields into signals indicating water current velocity and direction, said meter being characterized by the absence of connections between said rotor and said vane, said rotor and the interior of said housing, and said vane and the interior of said housing.

3. The combination claimed in claim 2 with a magnetic tape recorder mounted within said housing for recording said signals.

4. In an oceanographic meter, in combination, a hollow water-tight pressure housing having no opening therein, a water-current driven direction element mounted on the outside of said housing, and having means associated therewith for producing a magnetic field within said housing, said field varying with water current direction, a removable interior housing within said pressure housing, said interior housing including a pair of semi-cylindrical troughs hinged together at one side, means for locking said troughs in closed position, and shock isolation means for supporting said interior housing within said pressure housing, and electronic means within said interior housing for translating said magnetic field into signals indicatig water current direction.

5. In an oceanographic meter, in combination, a hollow water-tight pressure housing having no opening therein, a water-current driven direction element mounted on the outside of said housing, and having means associated therewith for producing a magnetic field within said housing, said field varying with water current direction, a removable interior housing within said pressure housing, and electronic means within said interior housing for translating said magnetic field into signals indicating water current direction, said interior housing containing a battery pack, a tape recorder for recording said signals, a pair of goniometers for supplying signals indicative of tilt of the oceanographic meter from respective axes, a magnetic compass for supplying signals indicative of the direction of said oceanographic meter from a predetermined direction, and electronic circuit boards.

6. The combination claimed in claim 5 with shock isolation means interposed between said battery pack and said tape recorder, between said tape recorder and said electronic circuit boards, between said circuit boards and said goniometers, and between said inner housing and said pressure housing.

7. In an oceanographic current meter, in combination, a pair of goniometers, means for delivering to said goniometers a relatively low-frequency oscillation, a phase comparator, means for impressing on said phase comparator said low-frequency oscillation, and said low-frequency oscillations shifted in phase by said goniometers, means for impressing on said phase comparator an oscillation relatively high in frequency as compared to said low-frequency oscillation, and a counter supplied by the output of said phase comparator for counting said high frequency oscillations during a time period represented by the phase shift of said low frequency oscillations from said goniometers.

8. The combination claimed in claim 7 with an incremental digital magnetic tape recorder fed by the output of said counter.

9. In an oceanographic current meter, in combination, a pair of housing tilt goniometers, a pair of bearing goniometers, means for supplying to said goniometers a low-frequency oscillation, a phase comparator, means for supplying to said phase comparator said low-frequency oscillation, means for supplying to said phase comparator a high-frequency oscillation and the low-frequency output of said goniometers shifted in phase, and a digital counter supplied by the output of said phase comparator for counting said high frequency oscillations during a time period represented by the phase shift of said low frequency oscillations from said goniometers.

10. The combination claimed in claim 9 with an incremental digital magnetic recorder fed by the output of said counter.

11. In an oceanographic current meter, in combination, a pair of bearing goniometers, a pair of tilt goniometers, a source of low-frequency oscillations, a source of high-frequency oscillations, a water current meter for generating a series of pulses indicating water current velocity, a water current direction vane coupled to one of said bearing goniometers, the other bearing goniometer responsive to deviations of said oceanographic current meter from a predetermined direction, means for impressing said low-frequency oscillation on said goniometers, a phase comparator, means for impressing on said phase comparator said low-frequency oscillation, said high-frequency oscillations, and the low-frequency outputs of said goniometers shifted in phase, a counter, and means for impressing on said counter the output of said phase comparator for counting said high frequency oscillations during a time period represented by the phase shift of said low frequency oscillations from said goniometers and a series of pulses indicating water current velocity.

12. In an oceanographic current meter having a water current driven rotor and a direction vane, in combination, a pair of bearing goniometers one of which is coupled to said directional vane and the other being responsive to deviations of said oceanographic meter from a predetermined direction, a pair of tilt goniometers, means for producing low and high frequency oscillations, a phase comparator, means for supplying to said phase comparator said low and high frequency oscillations, means for supplying to said goniometers said low-frequency oscillations, means for supplying to said phase comparator the output of said goniometers shifted in phase, a clock circuit, a count-down circuit coupled to said clock circuit, a programmer, a counter and an event counter, means for supplying the output of said phase comparator to said counter, means for supplying to said counter pulses indicating the speed of said rotor, means for supplying to said event counter the output of said count-down circuit and means for supplying signals from said programmer to said counter.

13. The combination claimed in claim 12 with an incremental digital magnetic tape recorder fed by the output of said counter.

14. The combination claimed in claim 12 with an incremental digital magnetic tape recorder, and means for supplying to said tape recorder the outputs of said counter and event counter.

References Cited

UNITED STATES PATENTS

| | | | |
|---|---|---|---|
| 2,375,227 | 5/1945 | Hillman | 73—189 |
| 2,592,583 | 4/1952 | Lyon | 73—189 |
| 2,688,250 | 9/1954 | Roberts | 73—189 |
| 2,756,404 | 7/1956 | Anderson et al. | 73—170 X |
| 2,913,900 | 11/1959 | Andrews | 73—189 |
| 3,094,869 | 6/1963 | Wehmann | 73—189 |
| 3,119,260 | 1/1964 | Karmin | 73—189 |
| 3,161,047 | 12/1964 | Griswold | 73—189 |
| 3,203,236 | 8/1965 | Prince | 73—189 |

RICHARD C. QUEISSER, *Primary Examiner.*

E. D. GILHOOLY, *Assistant Examiner.*